No. 767,049. PATENTED AUG. 9, 1904.
W. H. GREEN.
WATER PURIFYING APPARATUS.
APPLICATION FILED APR. 15, 1904.
NO MODEL. 2 SHEETS—SHEET 2.
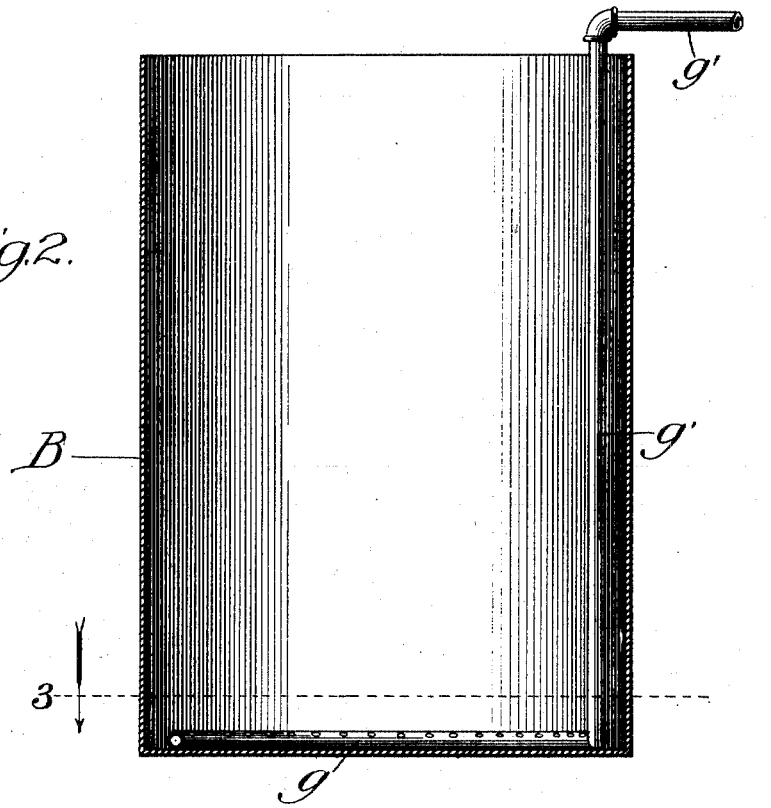
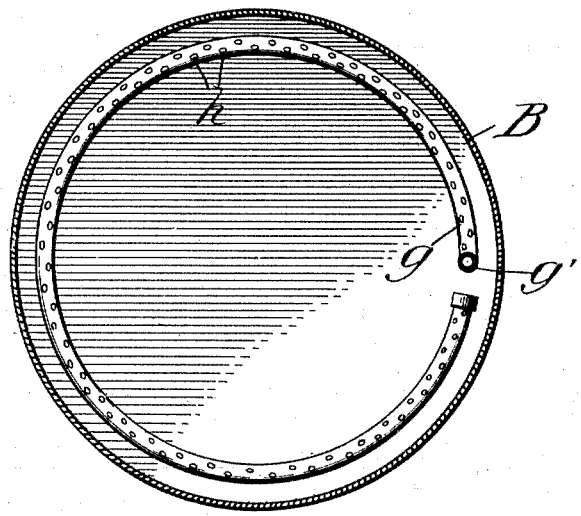
Witnesses:
Inventor:
Walter H. Green No. 767,049. Patented August 9, 1904.

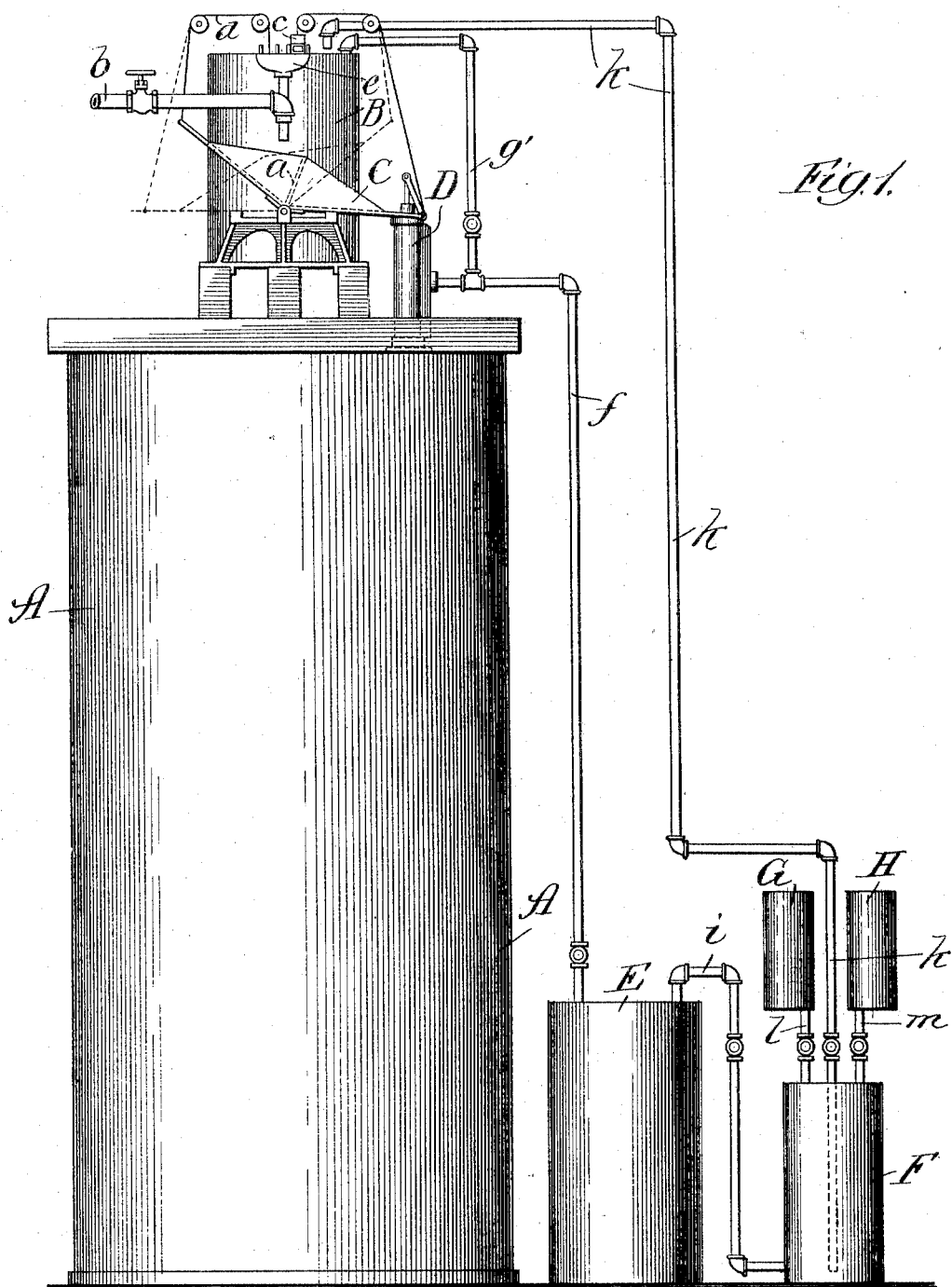

UNITED STATES PATENT OFFICE.

WALTER H. GREEN, OF CHICAGO, ILLINOIS, ASSIGNOR TO KENNICOTT WATER-SOFTENER COMPANY, OF CHICAGO, ILLINOIS, A CORPORATION OF ILLINOIS.

WATER-PURIFYING APPARATUS.

SPECIFICATION forming part of Letters Patent No. 767,049, dated August 9, 1904.

Application filed April 15, 1904. Serial No. 203,325. (No model.)

*To all whom it may concern:*

Be it known that I, WALTER H. GREEN, a citizen of the United States, residing at Chicago, in the county of Cook and State of Illinois, have invented a new and useful Improvement in Water-Purifying Apparatus, of which the following is a specification.

My invention relates to an improvement in the class of apparatus for chemically treating water the better to adapt it for industrial purposes by relieving it of its contained impurities which tend to render it injurious, particularly in the way of forming scale in steam-generating boilers.

The primary object of my invention is to reduce the expense of operating the apparatus by providing for the utilization of the power of the flow into it of the raw water to be treated for generating air-pressure power for automatic stirring, lifting, and other necessary and useful operations therein.

Referring to the accompanying drawings, Figure 1 is a view in elevation of a water-softening apparatus embodying my invention; Fig. 2, an enlarged view of the chemical-solution tank in vertical sectional elevation, and Fig. 3 a section taken at the line 3 on Fig. 2 and viewed in the direction of the arrow.

A is the precipitating-tank, which may be that of United States Letters Patent No. 646,108, dated March 27, 1900, to Cass L. Kennicott, or it may involve any other suitable construction. It is shown to be surmounted by a chemical-solution tank B, adjacent to which is journaled to rock on its support a tilting receptacle C, that shown being like and for the purpose of the one represented in United States Letters Patent to the aforesaid Kennicott, No. 732,357, dated June 30, 1903, though, as herein shown, the solution-dipping cups coöperating with the receptacle are actuated in accordance with my improvement upon the device of the last-named patent forming the subject of my application, Serial No. 203,324, filed concurrently herewith on the 15th day of April, 1904. The receptacle C, which is scoop-shaped toward its opposite ends and contains a central partition $a$, coinciding with the apex of its base, at which it is shown to be pivoted, is rocked by the force of the flow into it of the raw water to be purified pouring from a pipe $b$, whereby the rocking of the receptacle causes its chambers to fill alternately with the raw water. Moreover, the rocking of the receptacle to the positions indicated by dotted lines causes the chambers therein to be supplied alternately with chemical solution from the tank B in proper proportion for mixture with the charge of the raw water filled into each chamber. This automatic supply takes place through the medium of cups, one of which is shown at $c$, on a rope $d$ or other flexible medium dipping into the tank, wherein it carries the cups referred to and whence it passes over guide-pulleys, as shown, and is fastened at its ends to the ends of the tilting receptacle. Thus as the receptacle rocks in one direction it draws downward the respective end of the rope, raising the cup $c$, which discharges the solution raised by it out of the tank B into a trough or hopper $e$, discharging into the higher of the two chambers in the tilting receptacle, and as the latter rocks in the opposite direction it draws downward on the rope, accordingly to lower the previously-raised cup for refilling it and raising the other filled cup to the point of discharge into the hopper $e$.

With the receptacle C is connected an air-compressor, shown as an air-pump D, which may involve any suitable construction, to be actuated by the motion of the rocking receptacle—thus from the power of the water to be treated flowing into the apparatus. A valve-equipped air-pipe $f$ leads from the discharge side of the pump to a compressed-air reservoir E, and a valved branch $g'$ extends into the chemical-solution tank B from its upper end and to the bottom part of the latter, where it terminates in a pipe-coil $g$, provided with numerous perforations, (shown at $h$ in Fig. 3.) As the pump is actuated sufficient of the pressure generated by it is discharged through the coil $g$ into the contents of the tank B to agitate them and effect the constant stirring to which they require to be subjected for maintaining the proper strength of the solution. The action of the pump, furthermore, supplies air-pressure into the holder E, which is shown to communicate through a valved pipe $i$ with a reservoir F, serving as a mixing-tank, from near the base of which a valved discharge-pipe $k$ leads into the tank B. A receptacle G, which may serve for containing the soda solution, discharges through a valved pipe $l$ into the reservoir F, and a receptacle H, which may be the lime-slaker box, discharges into the reservoir through a valved pipe $m$. The supply of the chemical solution to the tank B may be fed thereto at desired intervals from the reservoir F by admitting therein from the reservoir E air-pressure the power of which exerted upon the contents of the holder F raises them through the pipe $k$ into the tank B.

The foregoing portray two specific useful purposes to which to apply the otherwise waste power of the inflowing water to be treated in the apparatus, and it may be applied therein with equal advantage to various other purposes and in other ways, all of which it is my intention to include within my invention. The general and particular arrangement of the mechanism for the two specified purposes is, however, peculiarly efficacious in accomplishing them.

What I claim as new, and desire to secure by Letters Patent, is—

1. In a water-purifying apparatus of the character described, the combination with the supply-pipe for the water to be treated, of a precipitating-tank, a chemical-solution holder discharging into said tank and an air-compressor actuated by the flow of said water to the apparatus to generate air-pressure for use therein.

2. In a water-purifying apparatus, the combination of an air-pump, power mechanism connected with said pump and driven to actuate the latter by the force of the water to be treated flowing into said apparatus, and a pipe or pipes for directing the air-pressure from said pump to one or more parts of said apparatus for use therein.

3. In a water-purifying apparatus, the combination of an air-pump, power mechanism connected with said pump and driven to actuate the latter by the force of the water to be treated flowing into said apparatus, an air-pressure reservoir into which said pump discharges, and a pipe leading from said reservoir to direct air-pressure therefrom to a part of said apparatus for use therein.

4. In a water-purifying apparatus, the combination of an air-pump, power mechanism connected with said pump and driven to actuate the latter by the force of the water to be treated flowing into said apparatus, a chemical-solution tank, a perforated air-pipe therein and a pipe leading from said pump to said air-pipe, substantially as and for the purpose set forth.

5. In a water-purifying apparatus, the combination of an air-pump, power mechanism connected with said pump and driven to actuate the latter by the force of the water to be treated flowing into said apparatus, a chemical-solution tank, an air-pressure reservoir into which said pump discharges, a mixing-tank having a pipe connection with said solution-tank, and a pipe connection between said reservoir and mixing-tank, substantially as and for the purpose set forth.

6. In a water-purifying apparatus, the combination of an air-pump, power mechanism connected with said pump and driven to actuate the latter by the force of the water flowing into said apparatus, a chemical-solution tank, an air-pressure reservoir into which said pump discharges, a mixing-tank supported below the plane of said solution-tank, one or more chemical-holders discharging into said mixing-tank, a pipe rising from said mixing-tank and discharging into said solution-tank, and a pipe connection between said reservoir and mixing-tank, substantially as and for the purpose set forth.

7. In a water-purifying apparatus, the combination of an air-pump, power mechanism connected with said pump and driven to actuate the latter by the force of the water flowing into said apparatus, a chemical-solution tank, a perforated air-pipe therein and a pipe leading from said pump to said air-pipe, an air-pressure reservoir into which said pump discharges, a mixing-tank having a pipe connection with said solution-tank, and a pipe connection between said reservoir and mixing-tank, substantially as and for the purpose set forth.

8. In a water-purifying apparatus, the combination with the precipitating-tank of a receptacle supported in the path of flow to said tank of the water to be treated and to be actuated by said flow to discharge into said tank, a chemical-solution tank from which the solution is supplied to said water, an air-pump connected with said receptacle to be actuated by the power of its movement, and a pipe leading from said pump to one or more parts of said apparatus for utilizing therein the air-pressure.

9. In a water-purifying apparatus, the combination with the precipitating-tank, of a receptacle supported in the path of flow to said tank of the water to be treated and to be actuated by said flow to discharge into said tank, a chemical-solution tank from which the solution is supplied to said water, an air-pump connected with said receptacle to be actuated by the power of its movement, a perforated air-pipe in said solution-tank and a pipe leading from said pump to said air-pipe, substantially as and for the purpose set forth.

10. In a water-purifying apparatus, the combination with the precipitating-tank, of a receptacle supported in the path of flow to said tank of the water to be treated and to be rocked by said flow to discharge into said tank, a chemical-solution tank from which the solution is supplied to said receptacle, an air-pump connected with said receptacle to be actuated by the power of its movement, a perforated air-pipe in said solution-tank having a pipe connection with the discharge side of said pump, an air-pressure reservoir into which said pump discharges, a mixing-tank having a pipe connection with said solution-tank and a pipe connection between said reservoir and mixing-tank, substantially as and for the purpose set forth.

WALTER H. GREEN.

In presence of—
WALTER N. WINBERG,
ALMA U. THORIEN.